United States Patent [19]

Saotome et al.

[11] Patent Number: 4,908,520
[45] Date of Patent: Mar. 13, 1990

[54] RADIATION IMAGE RECORDING, READ-OUT AND REPRODUCING APPARATUS

[75] Inventors: Shigeru Saotome; Masamitsu Ishida, both of Kanagawa, Japan

[73] Assignee: Fuji Photo Film Co., Ltd., Kanagawa, Japan

[21] Appl. No.: 182,820

[22] Filed: Apr. 18, 1988

[30] Foreign Application Priority Data

Apr. 17, 1987 [JP] Japan .................................. 62-94553
Apr. 17, 1987 [JP] Japan .................................. 62-94554

[51] Int. Cl.[4] .......................... G03G 5/16; H05B 33/00
[52] U.S. Cl. ................................ 250/327.2; 250/484.1
[58] Field of Search ............... 250/483.1, 327.2, 484.1, 250/317.1; 355/27

[56] References Cited

U.S. PATENT DOCUMENTS

| | | | |
|---|---|---|---|
| 4,400,619 | 8/1983 | Kotera et al. | 250/327.2 |
| 4,421,839 | 12/1983 | Takiguchi et al. | 250/317.1 |
| 4,497,887 | 2/1985 | Watanabe et al. | 250/317.1 |
| 4,704,529 | 11/1987 | Ohgoda et al. | 250/327.2 |
| 4,723,151 | 2/1988 | Sonezaki et al. | 355/27 |
| 4,771,174 | 9/1988 | Torii | 250/327.2 |
| 4,774,409 | 9/1988 | Yamamoto et al. | 250/327.2 |
| 4,789,782 | 12/1988 | Ohara | 250/484.1 |

Primary Examiner—Constantine Hannaher
Assistant Examiner—J. Eisenberg
Attorney, Agent, or Firm—Sughrue, Mion, Zinn, MacPeak & Seas

[57] ABSTRACT

A radiation image recording, read-out and reproducing apparatus comprises a case for housing a stimulable phosphor sheet and having an opening, a light shielding cover housed in the case for projection therefrom through the opening and having a sheet passage opening at an end on the side supported by the case at the time the light shielding cover is projected, recording section for recording a radiation image on the stimulable phosphor sheet disposed at an exposure position in the light shielding cover projected out of the case, a read-out section having a sub-scanning system for moving the stimulable phosphor sheet between the exposure position and a position in the case, and an erasing section. A reproducing section is provided for conveying a recording sheet housed in the case to feed the recording sheet out of the case through a feed-out opening of the case and, at the same time, reproducing the radiation image on the recording sheet.

74 Claims, 8 Drawing Sheets

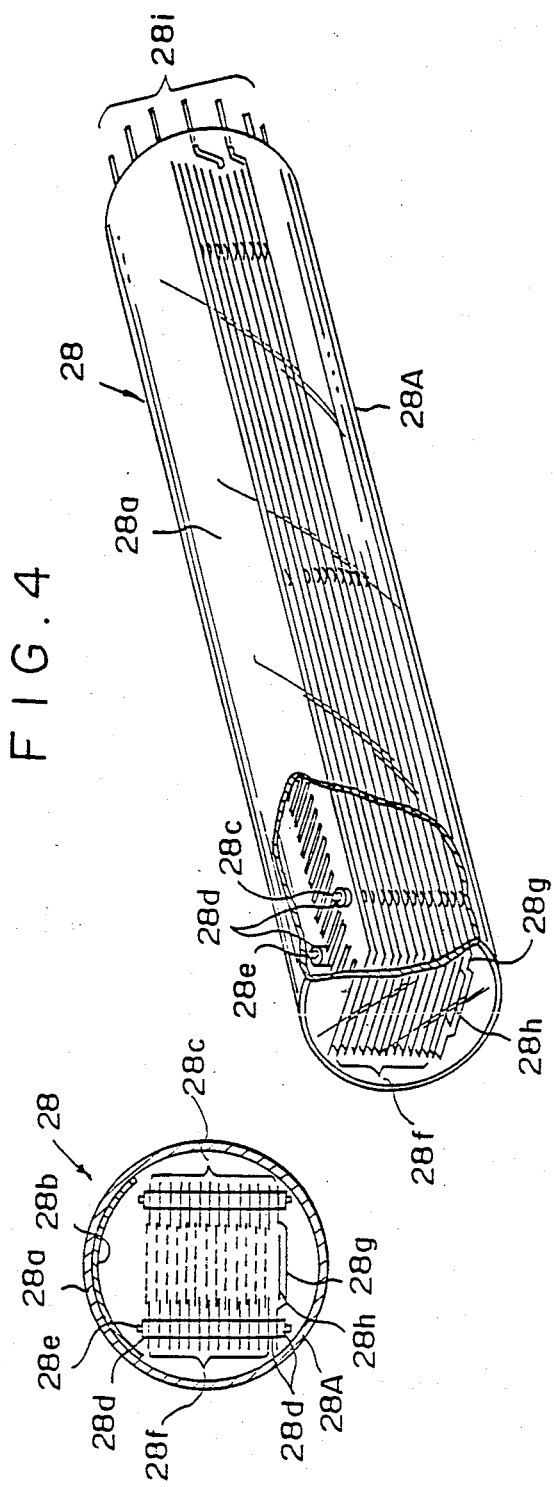

RADIATION IMAGE RECORDING, READ-OUT AND REPRODUCING APPARATUS

BACKGROUND OF THE INVENTION

1. Field of the Invention

This invention relates to a radiation image recording, read-out and reproducing apparatus for recording a radiation image, reading out the radiation image to obtain electric image signals, and reproducing the radiation image into a visible image on the basis of the image signals. This invention particularly relates to a radiation image recording, read-out and reproducing apparatus wherein a radiation image is recorded on a stimulable phosphor sheet capable of storing the radiation energy.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to electric image signals, which are processed as desired to reproduce a visible image having an improved image quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

In order to reuse stimulable phosphor sheets as mentioned above, the radiation energy remaining on the stimulable phosphor sheet after it is scanned with stimulating rays to read out the radiation image stored thereon should be erased by exposing the stimulable phosphor sheet to light or heat as described in, for example, U.S. Pat. No. 4,400,699 or Japanese Unexamined Patent Publication No. 56(1981)-12599 corresponding to U.S. Ser. No. 168,806 (abandoned). The stimulable phosphor sheet should then be used again for radiation image recording.

From the aforesaid viewpoint, the applicant proposed in Japanese Unexamined Patent Publication No. 59(1984)-192240 corresponding to U.S. Ser. No. 037,119, a radiation image recording and read-out apparatus comprising:

i) a circulation and conveyance means for conveying at least one stimulable phosphor sheet for recording a radiation image thereon along a predetermined circulation path, ii) an image recording section disposed on the circulation path for recording a radiation image of an object on the stimulable phosphor sheet by exposing the stimulable phosphor sheet to a radiation passing through the object, iii) an image read-out section disposed on the circulation path and provided with a stimulating ray source for emitting stimulating rays for scanning the stimulable phosphor sheet carrying the radiation image stored thereon at the image recording section, and a photoelectric read-out means for detecting light emitted by the stimulable phosphor sheet scanned with the stimulating rays to obtain electric image signals, and iv) an erasing section disposed on the circulation path for, prior to the next image recording on the stimulable phosphor sheet for which the image read-out has been carried out at the image read-out section, having the stimulable phosphor sheet release the radiation energy remaining on the stimulable phosphor sheet, whereby the stimulable phosphor sheet is circulated through the image recording section, the image read-out section and the erasing section, and reused for radiation image recording. With the radiation image recording and read-out apparatus having such a configuration, the radiation image recording and read-out can be carried out sequentially and efficiently.

However, with the radiation image recording and read-out apparatus having the aforesaid configuration wherein a plurality of the stimulable phosphor sheets are circulated and conveyed along the circulation path and sequentially sent to the image recording section, the image read-out section and the erasing section, the apparatus becomes large. Also, in order to reproduce the radiation image detected by the aforesaid apparatus into a visible image, an independent image reproducing apparatus is necessary. Therefore, at the time the reproduced visible radiation image is to be used for viewing purposes, particularly for diagnostic purposes, it is necessary for the operator to proceed to the location of the image reproducing apparatus or to have the reproduced visible radiation image sent from the location of the image reproducing apparatus.

Accordingly, with the aforesaid conventional radiation image recording and read-out apparatus, it is not always possible to satisfy the need in the medical field or the like for recording a radiation image at a desired location and viewing the reproduced visible radiation image at the location immediately after the image recording is carried out.

SUMMARY OF THE INVENTION

The primary object of the present invention is to provide a radiation image recording, read-out and reproducing apparatus which is provided with the radiation image reproducing function as well as the functions of recording a radiation image on a stimulable phosphor sheet and reading out the radiation image therefrom, and which is small.

Another object of the present invention is to provide a radiation image recording, read-out and reproducing apparatus which enables radiation image recording and reproduction even at a place where the radiation image recording has heretofore been impossible.

The present invention provides a first radiation image recording, read-out and reproducing apparatus which comprises:

i) a case for housing a stimulable phosphor sheet capable of storing a radiation image thereon, and provided at one case end with an opening through which a light shielding cover is to be passed, ii) the light shielding cover housed in said case for projection out of said case through said opening for passage of the light shielding cover, and provided with a sheet passage opening at an end on the side supported by said case at the time said light shielding cover is projected out of said case, iii) an image recording section for exposing said stimulable phosphor sheet, which is disposed at an exposure position inside of said light shielding cover projected out of said case, to radiation carrying image information, thereby to have the radiation image stored on said stimulable phosphor sheet, iv) an image read-out section provided with a read-out sub-scanning means for moving said stimulable phosphor sheet between said exposure position and a position in said case to which said stimulable phosphor sheet advances through said sheet passage opening, and a read-out main scanning means for scanning said stimulable phosphor sheet by a beam of stimulating rays in a main scanning direction at a position inside of said case in the vicinity of said opening for passage of the light shielding cover, wherein said stimulable phosphor sheet carrying said radiation image stored thereon is exposed to the beam of stimulating rays which cause said stimulable phosphor sheet to emit light in proportion to the stored radiation energy, and the emitted light is detected by a photoelectric read-out means to obtain image signals, v) an erasing section for releasing the radiation energy remaining on said stimulable phosphor sheet, for which the image read-out has been carried out at said image read-out section, before the image recording is carried out on said stimulable phosphor sheet, and vi) an image reproducing section for conveying a recording sheet housed in said case to feed said recording sheet out of said case through a recording sheet feed-out opening of said case and, at the same time, reproducing the image, which said image signals represent, of said recording sheet.

With the first radiation image recording, read-out and reproducing apparatus in accordance with the present invention, the read-out of the radiation image from the stimulable phosphor sheet at the image read-out section provided with the read-out sub-scanning means and the readout main scanning means can be carried out by moving the stimulable phosphor sheet from the light shielding cover, which is projected out of the case and into the case. Alternatively, in the case where the image read-out is to be carried out after the stimulable phosphor sheet has been returned into the case, the image read-out can be carried out by moving the stimulable phosphor sheet from the case into the light shielding cover projected out of the case. Specifically, the space for the movement of the stimulable phosphor sheet for the purpose of the sub-scanning is ensured by the projection of the light shielding cover out of the case. Therefore, it is only necessary that the size of the case be such that the light shielding cover and the stimulable phosphor sheet can be housed therein when the apparatus is out of use, and the case can be made small nearly to a size slightly larger than the longitudinal and transverse dimensions of a single stimulable phosphor sheet.

As mentioned above, with the first radiation image recording, read-out and reproducing apparatus in accordance with the present invention wherein the stimulable phosphor sheet is moved for sub-scanning with stimulating rays at the time of the image read-out between the position in the case and the position in the light shielding cover projected out of the case, it is not necessary to provide a space in the case for conveying the stimulable phosphor sheet for the purpose of the sub-scanning with stimulating rays, and the apparatus can be made very small. Therefore, the first radiation image recording, read-out and reproducing apparatus in accordance with the present invention can readily be provided in a mobile X-ray diagnostic station, a ship or the like wherein it is not always possible to ensure a large space for loading with a medical diagnosis apparatus or the like, and enables radiation image recording and reproduction even at a place where the radiation image recording has heretofore been impossible. This is very advantageous for medical diagnosis and other purposes.

The present invention also provides a second radiation image recording, read-out and reproducing apparatus which comprises:

i) a case for housing a stimulable phosphor sheet capable of storing a radiation image thereon, and provided at one case end with a stimulable phosphor sheet passage opening through which the stimulable phosphor sheet is to be passed, ii) an image recording section for exposing said stimulable phosphor sheet disposed at an exposure position inside of said case to radiation carrying image information, thereby to have the radiation image stored on said stimulable phosphor sheet, iii) an image read-out section provided with a read-out sub-scanning means for moving said stimulable phosphor sheet between said exposure position and a position to which said stimulable phosphor sheet is projected out of said case through said opening, and a read-out main scanning means for scanning said stimulable phosphor sheet by a beam of stimulating rays in a main scanning direction at a position inside of said case in the vicinity of said opening, wherein said stimulable phosphor sheet carrying said radiation image stored thereon is exposed to the beam of stimulating rays which cause said stimulable phosphor sheet to emit light in proportion to the stored radiation energy, and the emitted light is detected by a photoelectric read-out means to obtain image signals, iv) an erasing section for releasing the radiation energy remaining on said stimulable phosphor sheet, for which the image read-out has been carried out at said image read-out section, before the image recording is carried out on said stimulable phosphor sheet, and v) an image reproducing section for conveying a recording sheet housed in said case to feed said recording sheet out of said case through a recording sheet feed-out opening of said case and, at the same time, reproducing the image, which said image signals represent, on said recording sheet.

With the second radiation image recording, read-out and reproducing apparatus in accordance with the present invention, the read-out of the radiation image from the stimulable phosphor sheet at the image read-out section provided with the read-out sub-scanning means and the read-out main scanning means can be carried out by projecting the stimulable phosphor sheet out of the case, or by moving the stimulable phosphor sheet into the case from the position projected out of the case. Also, reproduction of the radiation image on the recording sheet can be carried out by feeding the recording sheet out of the case. Specifically, the space outward from the case is utilized as the space for the sheet movement for the purposes of the sub-scanning with stimulating rays and conveyance of the recording sheet. Therefore, the case can be made small nearly to a size slightly larger than the longitudinal and transverse dimensions of a single stimulable phosphor sheet.

As mentioned above, with the second radiation image recording, read-out and reproducing apparatus in accordance with the present invention wherein the stimulable phosphor sheet is projected out of the case in the course of the image read-out, it is not necessary to provide a space in the case for conveying the stimulable phosphor sheet for the purpose of the sub-scanning with stimulating rays. Also, the reproduction of the radiation image on the recording sheet can be carried out by feeding the recording sheet out of the case, and no broad space need be provided in the case for the conveyance of the recording sheet. Therefore, the apparatus can be made very small. Accordingly, the second radiation image recording, read-out and reproducing apparatus in accordance with the present invention can readily be provided in a ship, a submarine boat or the like wherein it is not always possible to ensure a large space for loading with a medical diagnosis apparatus or the like, and enables radiation image recording and reproduction even at a place where the radiation image recording has heretofore been impossible. This is very advantageous for medical diagnosis and other purposes.

BRIEF DESCRIPTION OF THE DRAWINGS

FIGS. 4 and 5 is a partially cutaway perspective view and a sectional side view showing a long photomultiplier employed in the radiation image recording, read-out and reproducing apparatus in accordance with the present invention.

DESCRIPTION OF THE PREFERRED EMBODIMENTS

The present invention will hereinbelow be described in further detail with reference to the accompanying drawings.

Figure 1:
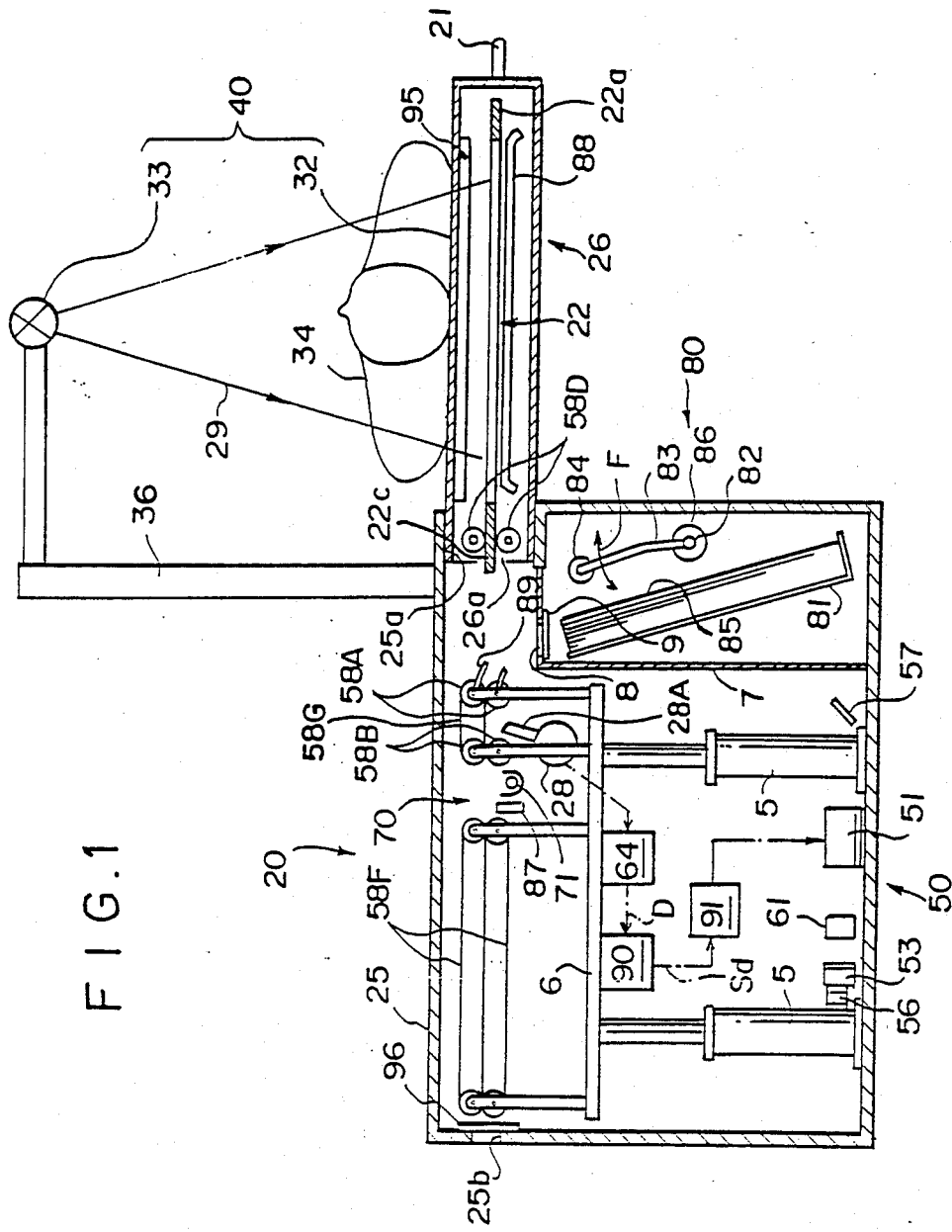
FIG. 1 is a schematic side view showing an embodiment of the first radiation image recording, read-out and reproducing apparatus in accordance with the present invention, which is in the radiation image recording condition.
Figure 2:
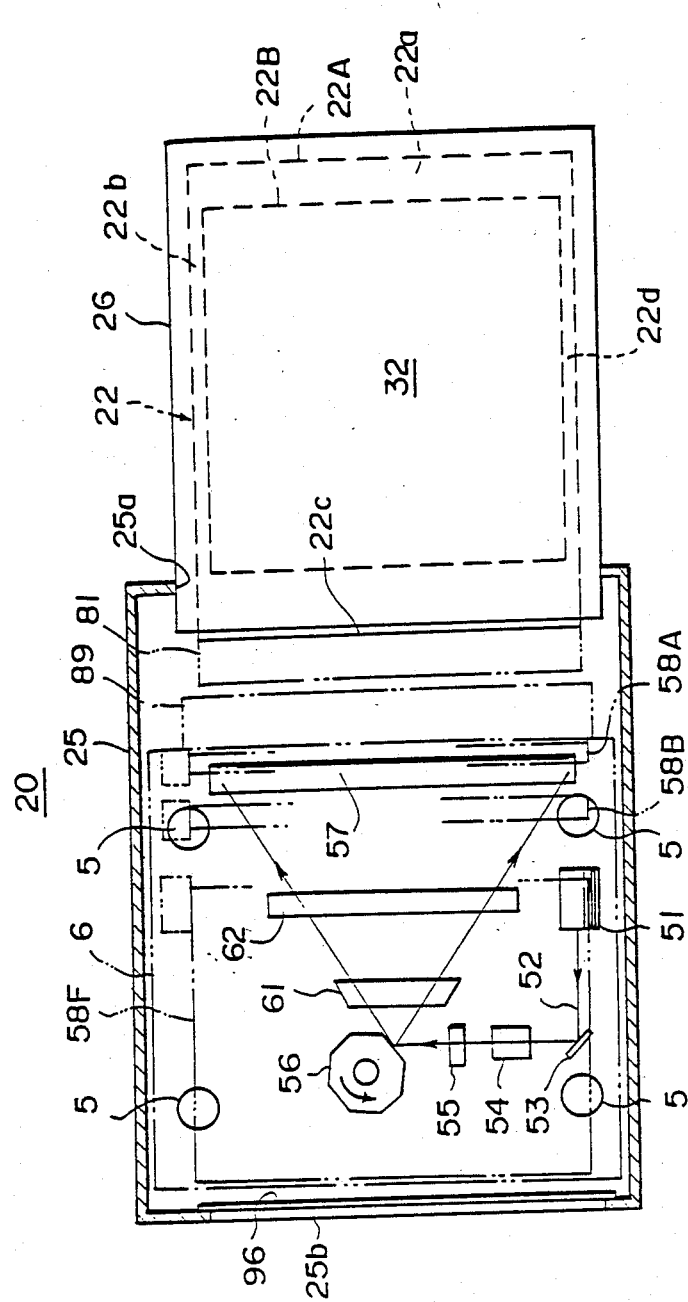
FIG. 2 is a schematic plan view showing the embodiment shown in FIG. 1.

FIG. 1 shows the side view of an embodiment of the first radiation image recording, read-out and reproducing apparatus in accordance with the present invention, and FIG. 2 shows the plan view thereof. This embodiment is provided with a main body 20, and a radiation source 33 supported by an arm 36. A case 25 constituting the main body 20 houses therein a light shielding cover 26 projectable out of the case 25. The light shielding cover 26 is housed in the case 25 when the apparatus is out of use When the apparatus is to be used, the light shielding cover 26 is pulled out of the case 25 by gripping at a handle 21. A lifting base 6 moveable up and down by four cylinder devices 5, 5, (such as pistons) ... is provided in the case 25. The lifting base 6 supports thereon drive rollers 58A constituted by a pair of nip rollers, drive rollers 58B constituted by a pair or nip rollers, a pair of endless belts 58F disposed one above the other, a photomultiplier 28 as the photoelectric read-out means, an erasing light source 71 and a development heat source 87. An endless belt 58G is applied around the upper roller of the drive rollers 58A and the upper roller of the drive rollers 58B. On the other hand, drive rollers 58D constituted by a pair or nip rollers are provided at the end (the left end in FIG. 1) of the light shielding cover 26 on the side supported by the case 25. At the time the lifting base 6 has been moved up to the position shown in FIG. 1, the drive rollers 58A and 58B are maintained at the same height as the drive rollers 58D.

Also, a stimulable phosphor sheet 22 is disposed so that it is grasped at least by the drive rollers 58A, the drive rollers 58B, the drive rollers 58D, or the endless belts 58F. The stimulable phosphor sheet 22 is composed of a plate-like substrate 22A and a stimulable phosphor layer 22B overlaid on the substrate 22A. After the lifting base 6 is moved to the position as shown in FIG. 1, the drive rollers 58A and 58B (and consequently the endless belts 58G), the drive rollers 58D, and the endless belts 58F are rotated in the normal direction or reversely to convey the stimulable phosphor sheet 22 horizontally between the case 25 and the light shielding cover 26. The substrate 22A of the stimulable phosphor sheet 22 is formed to be larger than the stimulable phosphor layer 22B, and the portions of the substrate 22A around the stimulable phosphor layer 22B constitute holding portions 22a, 22b, 22c and 22d, as illustrated in FIG. 2. In this embodiment, the stimulable phosphor sheet 22 is positioned so that the stimulable phosphor layer 22B comes under the substrate 22A. The longitudinal and transverse dimensions of the case 25 are slightly larger than the longitudinal and transverse dimensions of the stimulable phosphor sheet 22.

As shown in FIG. 1, the case 25 is provided with an opening 25a at the case end on the right side, and the light shielding cover 26 housed in the case 25 is projectable out of the case 25 through the opening 25a. Though the light shielding cover 26 is manually projected out of the case 25 by gripping at the handle 21 in this embodiment, the light shielding cover 26 may instead be moved by a drive device and projected out of the case 25. The light shielding cover 26 is provided with a sheet passage opening 26a at one end, i.e. at the end on the side supported by the case 25 when the light shielding cover 26 is projected out of the case 25. Therefore, the inside of the light shielding cover 26 is communicated with the inside of the case 25 via the sheet passage opening 26a. At the time the light shielding cover 26 is housed in the case 25, the stimulable phosphor sheet 22 is positioned inside of the light shielding cover 26. Also, at this time, the lifting base 6 is moved down to the position free from interference with the light shielding cover 26.

The upper surface of the light shielding cover 26, i.e. the surface thereof facing the stimulable phosphor sheet 22 from above at the time the stimulable phosphor sheet 22 is housed in the light shielding cover 26, constitutes an image recording table 32. As shown in FIG. 1, in the use condition with the light shielding cover 26 pulled out of the case 25, the radiation source 33 constituted by an X-ray tube or the like faces the image recording table 32. The case 25 and the regions of the light shielding cover 26 outside of the image recording table 32 are lined with a radiation absorbing material such as a lead plate so that no fog is caused to arise on the stimulable phosphor sheet 22 by environmental radiations or the like other than the radiation used for the image recording.

In the course of the recording of a radiation image of an object 34, the object 34 is made to lie, for example, on his back, on the image recording table 32 of the light shielding cover 26 projected out of the case 25, and the stimulable phosphor sheet 22 is conveyed by the rotations of the drive rollers 58A, 58B, 58D and the endless belts 58F up to the exposure position facing the image recording table 32 as shown in FIG. 1. The radiation source 33 is activated in this condition, and the stimulable phosphor sheet 22 is exposed to radiation 29 produced by the radiation source 33 and passing through the object 34 to have a radiation image of the object 34 stored thereon, specifically on the stimulable phosphor layer 22B formed on the lower surface side of the stimulable phosphor sheet 22. In the light shielding cover 26, the stimulable phosphor sheet 22 is supported by a sheet support 88. Thus, in this embodiment, an image recording section 40 is constituted by the image recording table 32 and the radiation source 33. Also, as shown in FIG. 1, a grid 95 for absorbing radiation scattered by the object 34 is provided in the light shielding cover 26 under the image recording table 32. The grid 95 may be constituted as a bucky device reciprocally moved in the horizontal direction.

An image read-out section 50 is provided in the case 25. As shown in FIG. 2, the image read-out section 50 is provided with a laser beam source 51 constituted by, by way of example, a semiconductor laser, a mirror 53 for reflecting a laser beam 52 produced as stimulating rays by the laser beam source 51, a beam expander 54 for adjusting the beam diameter of the laser beam 52 to a predetermined value, a cylindrical lens 55 for making the laser beam 52 impinge upon a mirror surface of a light deflector 56 as will be described later so as to form a linear image normal to the rotation axis of the light deflector 56, and the light deflector 56 constituted by a rotating polygon mirror or the like for reflecting and deflecting the laser beam 52. The image read-out section 50 is also provided with a long mirror 57 for reflecting the deflected laser beam 52 so that the laser beam 52 scans the stimulable phosphor sheet 22, specifically the stimulable phosphor layer 22B thereof, in one direction, and the drive rollers 58A, 58B and the endless belts 58F, 58G as a read-out sub-scanning means. The image read-out section 50 also comprises a long photomultiplier 28 as the photoelectric read-out means positioned so that the light receiving face thereof extends along the scanning line (main scanning line) of the laser beam 52 on the stimulable phosphor sheet 22, and a light guide member 28A optically coupled with the light receiving face of the long photomultiplier 28. Also, an $f\theta$ lens 61 and a cylindrical lens 62 are provided between the light deflector 56 and the mirror 57, and the laser beam 52 is thereby made to converge to a predetermined beam diameter at every position on the stimulable phosphor sheet 22.

Figure 3:
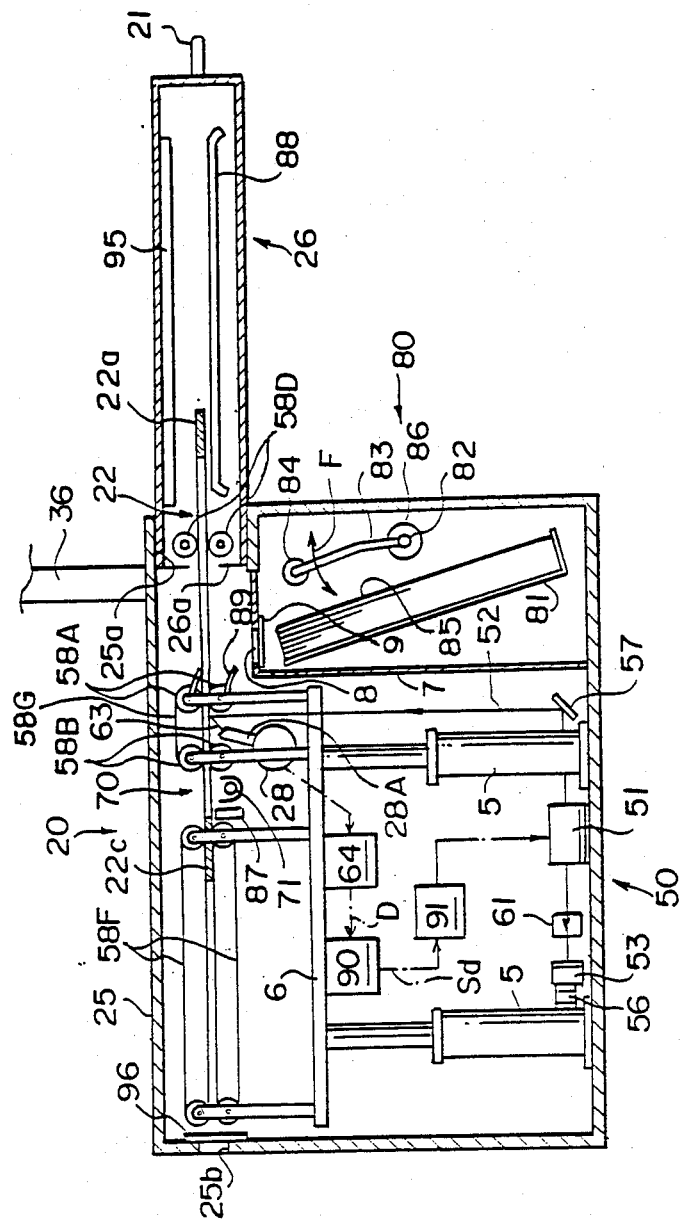
FIG. 3 is a schematic side view showing the embodiment shown in FIG. 1, which is in the image read-out condition.

With reference to FIG. 3, after the radiation image of the object 34 has been stored on the stimulable phosphor sheet 22 in the manner as mentioned above, the drive rollers 58D, 58B, 58A (and consequently the endless belt 58G) and the endless belts 58F are rotated, and the stimulable phosphor sheet 22 is moved at a predetermined speed from the light shielding cover 26 into the case 25. In the course of the radiation image recording, the drive rollers 58D grasp the holding portion 22c formed at one end of the stimulable phosphor sheet 22. Therefore, when the drive rollers 58D are rotated after the image recording has been carried out, the stimulable phosphor sheet 22 can be immediately conveyed as mentioned above. Simultaneously with the conveyance of the stimulable phosphor sheet 22, the laser beam source 51 and the light deflector 56 are activated, and the laser beam 52 scans on the stimulable phosphor sheet 22. As the stimulable phosphor sheet 22 is exposed to the laser beam 52, the exposed portion of the stimulable phosphor sheet 22 emits light 63 carrying the radiation image stored thereon. The emitted light 63 is efficiently detected by the long photomultiplier 28 via the light guide member 28A. The scanning of the laser beam 52 in the main scanning direction is carried out in the manner as mentioned above and, at the same time, the stimulable phosphor sheet 22 is moved in the sub-scanning direction in the manner as mentioned above. Accordingly, the emitted light 63, i.e. the radiation image, is two-dimensionally read out from the stimulable phosphor sheet 22. The read-out image signals generated by the long photomultiplier 28 are amplified, digitized and subjected to processing such as image processing in a read-out circuit 64, and are then sent to an image reproducing section 80 as will be described later.

The long photomultiplier 28 is described in detail in, for example, Japanese Unexamined Patent Publication No. 62(1987)-16666 corresponding to U.S. Ser. No. 141,259, and will be briefly described hereinbelow with reference to FIGS. 4, 5 and 6. By way of example, as shown in FIGS. 4 and 5, the photomultiplier 28 has an electrode configuration generally called the venetian blind type. The photomultiplier 28 comprises a cylindrical body 28A, a photocathode 28b disposed along the inner surface of the body 28A to face a light receiving face 28a, and a multiplying section 28f disposed under the photocathode 28b and including a plurality (13 pieces in this example) of plate-like dynodes 28c which are stacked via insulating members 28d, 28d secured by pins 28e, 28e. The dynodes 28c are respectively constituted by a conductive plate provided with a plurality of sections cut in a U-shape and bent to form a blind-like shape. A shield electrode 28g is secured by the pins 28e, 28e under the multiplying section 28f via the insulating members 28d, 28d and an anode 28h is disposed inside of the shield electrode 28g. These electrodes are electrically connected in one-to-one relation with terminals of a terminal group 28i disposed at the side end of the body 28A. The shield electrode 28g need not necessarily be provided.

Figure 6:
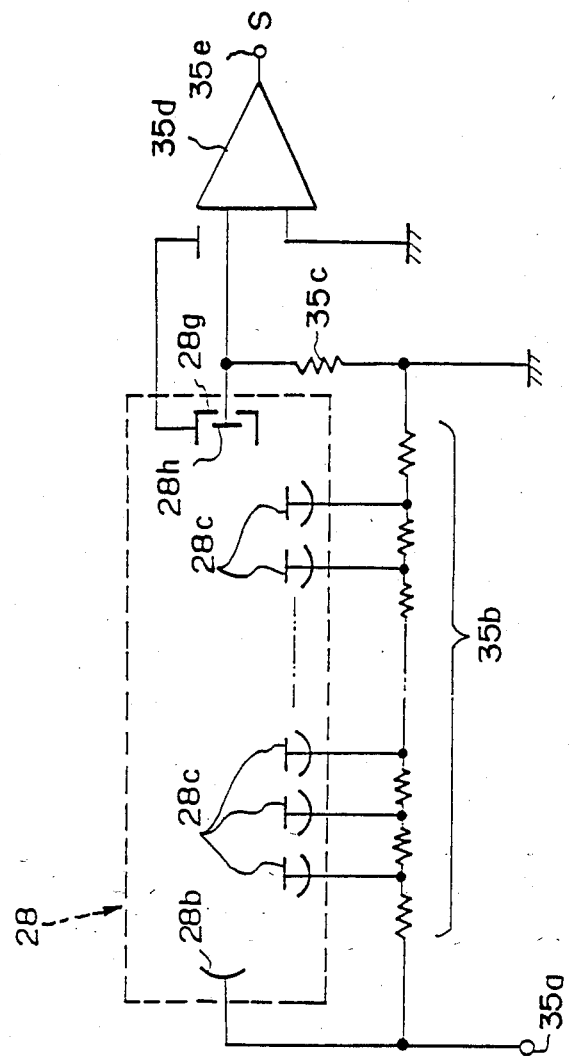
FIG. 6 is a circuit diagram showing the electric circuit of the long photomultiplier shown in FIG. 4.

FIG. 6 shows an electric circuit for operating the photomultiplier 28 and obtaining a photoelectric output. In FIG. 6, similar elements are numbered with the same reference numerals with respect to FIGS. 4 and 5. The operations of the photomultiplier 28 will hereinbelow be described with reference to FIG. 6. A high negative voltage is applied to the photocathode 28b via a high negative voltage applying terminal 35a. The high negative voltage applied to the high negative voltage applying terminal 35a is divided by a bleeder resistance group 35b into voltages which are applied respectively to the dynodes 28c. The shield electrode 28g is grounded, and the anode 28h is connected with the bleeder resistance group 35b via a resistor 36c and with an amplifier 35d. Photoelectrons released from the photocathode 28b upon exposure to the light 63 emitted by the stimulable phosphor sheet 22 impinge upon the dynodes 28c in the course of advancement toward the anode 28h, and secondary electrons are thus released from the dynodes 28c. In this manner, the photoelectrons are sequentially amplified by the dynodes 28c, and the current thus obtained is fed to the amplifier 35d. The photoelectrically converted image information is thus obtained as analog electric signals (read-out image signals) from an output terminal 35e of the amplifier 35d The long photomultiplier 28 is not limited to the photomultiplier having the aforesaid venetian blind type electrode configuration, and a photomultiplier having a box type electrode configuration as disclosed in, for example, Japanese Unexamined Patent Publication No. 62(1987)-16666 corresponding to U.S. Ser. No. 141,259, may be employed.

A filter for selectively transmitting the light 63 emitted by the stimulable phosphor sheet 22 and intercepting the laser beam 52 reflected by the surface of the stimulable phosphor sheet 22 should preferably be provided between the light guide member 28A and the photomultiplier 28, or the light guide member 28A should preferably be provided with such a filter function.

As shown in FIG. 3, when the stimulable phosphor sheet 22 is moved by the drive rollers 58D or also by the other drive rollers for the purpose of the sub-scanning, the stimulable phosphor sheet 22 passes through the sheet passage opening 26a and enters the case 25 from the light shielding cover 26. Also, the laser beam 52 scans the stimulable phosphor sheet 22 at the position near the opening 25a of the case 25. At the time the image read-out has been finished, the stimulable phosphor sheet 22 is positioned inside of the case 25. Therefore, the case 25 need not be provided with a particular space for sub-scanning of the stimulable phosphor sheet 22, and may be formed in a size slightly larger than the size of the stimulable phosphor sheet 22 as mentioned above.

At the time the image read-out has been finished in the manner as mentioned above, the stimulable phosphor sheet 22 is held between the endless belts 58F. Then, the endless belts 58F and the drive rollers 58A, 58B, 58D are rotated in the directions reverse to the directions of rotation at the time of the image read-out, and the stimulable phosphor sheet 22 is thereby returned to the exposure position inside of the light shielding cover 26. At this time, the stimulable phosphor sheet 22 passes over an erasing section 70 provided between the drive rollers 58B and the endless belts 58F, and is subjected to image (residual image) erasing. By way of example, the erasing section 70 is constituted by an erasing light source 71 facing the stimulable phosphor sheet 22 form below. The erasing light source 71 is constituted by a fluorescent lamp or the like, and mainly produces erasing light having a wavelength within the stimulation wavelength range for the stimulable phosphor of the stimulable phosphor sheet 22. The erasing light source 71 is turned on at the time the stimulable phosphor sheet 22 is returned into the light shielding cover 26. As the stimulable phosphor sheet 22, specifically the stimulable phosphor layer 22B, is exposed to the erasing light, the radiation energy remaining on the stimulable phosphor sheet 22 after the image read-out therefrom has been finished is released therefrom.

In this manner, the stimulable phosphor sheet 22 on which the image (residual image) has been erased to such an extent that the stimulable phosphor sheet 22 becomes reusable for the radiation image recording is housed in the light shielding cover 26. Therefore, the image recording and the image read-out can be repeated by use of the stimulable phosphor sheet 22. As the erasing light source, a tungsten-filament lamp, a halogen lamp, an infrared lamp, a xenon flash lamp or the like as disclosed in U.S. Pat. No. 4,400,619 may be selected as well as the aforesaid fluorescent lamp. In the case where the substrate 22A of the stimulable phosphor sheet 22 is formed of a transparent material, the erasing light can be irradiated to the stimulable phosphor layer 22B via the substrate 22A from above the stimulable phosphor sheet 22. Also, instead of providing the erasing light source 71 in the case 25, the erasing light source 71 may be provided inside of the light shielding cover 26.

In the case where the stimulable phosphor sheet 22 has been stored in the case 25 without being used for a long period after being subjected to the image (residual image) erasing at the erasing section 70, the stimulable phosphor sheet 22 stores energy of radiations emitted by radioactive isotopes such as Ra226, which are contained in a trace amount in the stimulable phosphor, or energy of environmental radiations. These types of radiation energy undesirably stored on the stimulable phosphor sheet 22 cause noise in a radiation image recorded next on the stimulable phosphor sheet 22. Exactly prior to the image recording, such radiation energy is erased (secondary erasing) by reciprocally moving the stimulable phosphor sheet 22 and exposing the stimulable phosphor sheet 22 to the erasing light produced by the erasing light source 71.

Reproduction of the radiation image will be described below. The image reproducing section 80 is provided with a recording sheet feed tray 81 disposed near the opening 25a in the case 25, an arm 83 supported swingably in the direction as indicated by the arrow F around a swing shaft 82, a recording sheet feed roller 84 supported at an extremity of the arm 83 for clockwise rotation, an arm operation means 86 for swinging the arm 83 in the direction as indicated by the arrow F to push the recording sheet feed roller 84, which is being rotated, against heat development photosensitive material sheets 85, 85, ... as recording sheets stacked in the recording sheet feed tray 81, thereby to feed the recording sheets 85, 85, ... one by one out of the recording sheet feed tray 81, and an elongated heat source 87 for heat development extending over the overall width of the recording sheet 85 between the drive rollers 58B and the endless belts 58F. The recording sheet feed tray 81 is surrounded by a light shielding member 7 so that no fog arises on the recording sheets 85, 85, ... housed therein. The light shielding member 7 is provided with an opening 8 above the recording sheet feed tray 81. The opening 8 is normally closed by a shutter 9.

Digital image signals D generated by the read-out circuit 64 are fed to a reproduction control section 90. The reproduction control section 90 operates the light deflector 56, the drive rollers 58A, 58B and the endless belts 58F in the same manner as in the course of the image read-out, operates the arm operation means 86 and the recording sheet feed roller 84, and opens the shutter 9, thereby feeding the recording sheets 85, 85, ... one by one out of the recording sheet feed tray 81. The recording sheet 85 thus fed out passes through the opening 8 of the light shielding member 7, is fed between the drive rollers 58A by being guided by a sheet guide 89, and is conveyed toward the endless belts 58F. As the endless belt 58G is applied around the drive rollers 58A, 58B, even though the recording sheet 85 is comparatively rigid, the recording sheet 85 can be conveyed smoothly. The reproduction control section 90 feeds operation control signals Sd based on the received digital image signals D to a driver 91 for the laser beam source 51. As the operation of the laser beam source 51 is controlled in this manner, the laser beam 52 modulated in accordance with the image signals D two-dimensionally scans the recording sheet 85. In this manner, a latent image of the image which the image signals D represent, i.e. a latent image of the radiation image which was stored on the stimulable phosphor sheet 22, is recorded on the heat development photosensitive material sheet 85. At the time of passage between drive rollers 58B and the endless belts 58F, the recording sheet 85 is heated by the heat source 87, so that the latent image is heat-developed and the radiation image is reproduced as a visible image on the recording sheet 85. The recording sheet 85 on which the radiation image has been recorded in this manner is fed out of the case 25 via opening 25b of the case 25. The opening 25b is closed by a shutter 96 at the time other than the radiation image reproduction.

Instead of providing the heat source 87, the erasing light source 71 may be utilized as the heat source for the heat development. However, in this case, it is necessary to provide a shutter for transmitting heat in the course of the development and intercepting at least light having a wavelength within the excitation wavelength range for the heat development photosensitive material so that no erasing light impinges upon the recording sheet 85. Also, instead of directly modulating the laser beam 52 by controlling the operation of the laser beam source 51, the laser beam 52 may be modulated by use of an acousto-optic modulator (AMO), an electro-optic modulator (EOM), or the like.

In this embodiment, the main scanning means, the sub-scanning means and the beam generating means for the image read-out are utilized in common with the main scanning means, the sub-scanning means and the beam generating means for the image reproduction. However, a part or all of these means for the image read-out may be provided independently of a part or all of the means for the image reproduction. However, they should preferably be utilized in common in order to make the apparatus smaller and to reduce the cost.

As the recording sheet on which the radiation image is to be reproduced, a silver halide photographic film subjected to ordinary wet development processing, an instant photographic film requiring no wet processing, or a heat sensitive recording sheet may be used as well as the aforesaid dry silver recording sheet 85. In the case where the ordinary silver halide photographic film is used, the film may be exposed for recording a photographic latent image by scanning with the laser beam 52, and then sent to an automatic developing machine or the like for carrying out the development. In the case where the instant photographic film is used, a development processing solution may be spread by nipping the film between the drive rollers 58A, 58B (via the endless belt 58G on the upper side). On the other hand, in the case where the heat sensitive recording sheet is used, recording can be effected by heat of the laser beam 52 by scanning with the laser beam 52 in the same manner as mentioned above, or by use of a thermal head.

In the aforesaid embodiment, the image read-out is carried out from the side opposite to the radiation irradiating side with respect to the stimulable phosphor sheet 22. However, it is also possible to carry out the image read-out from the same side as the radiation irradiating side by irradiating the laser beam 52 from the radiation irradiating side with respect to the stimulable phosphor sheet 22, and disposing the stimulable phosphor sheet 22 with the stimulable phosphor layer facing the radiation irradiating side. Also, after the image recording step, the stimulable phosphor sheet 22 may be quickly returned into the case 25, and then moved from the case 25 into the light shielding cover 26 for carrying out the image read-out. In this case, the stimulable phosphor sheet 22 prior to the image read-out step is quickly retracted from the position facing the image recording table 32, and therefore the stimulable phosphor sheet 22 can be prevented from the formation of fog caused by environmental radiations or the like.

Also, the photoelectric read-out means used in the present invention is not limited to the long photomultiplier 28. By way of example, a photoelectric read-out means composed of a photodetector having a comparatively small light receiving face and a light guide member optically coupled with each other as disclosed in, for example, Japanese Unexamined Patent Publication No. 59(1984)-192240 corresponding to U.S. Ser. No. 037,119, may also be used. However, the long photomultiplier 28 is advantageous since it eliminates the problems with regard to an increase in the apparatus size caused by the use of the large light guide member, a decrease in the light detection efficiency caused by leak of the light emitted by the stimulable phosphor sheet from the light guide member, and an increase in the cost of the apparatus caused by the formation of the light guide member having a complicated shape. Also, in the case where the long photomultiplier 28 is utilized, the light guiding efficiency can be improved by combination with the light guiding reflection mirror 60, combination with an integrating cylinder as disclosed in Japanese Unexamined Patent Publication No. 62(1987)-16668, or combination with the integrating cylinder and the reflection optical element as disclosed in Japanese Unexamined Patent Publication No. 62(1987)-16669 corresponding to U.S. Ser. No. 141,259.

Embodiments of the second radiation image recording, read-out and reproducing apparatus in accordance with the present invention will be described below with reference to FIGs. 7 to 11. In FIGS. 7 to 11, similar elements are numbered with the same reference numerals with respect to FIGS. 1 to 3.

Figure 7:
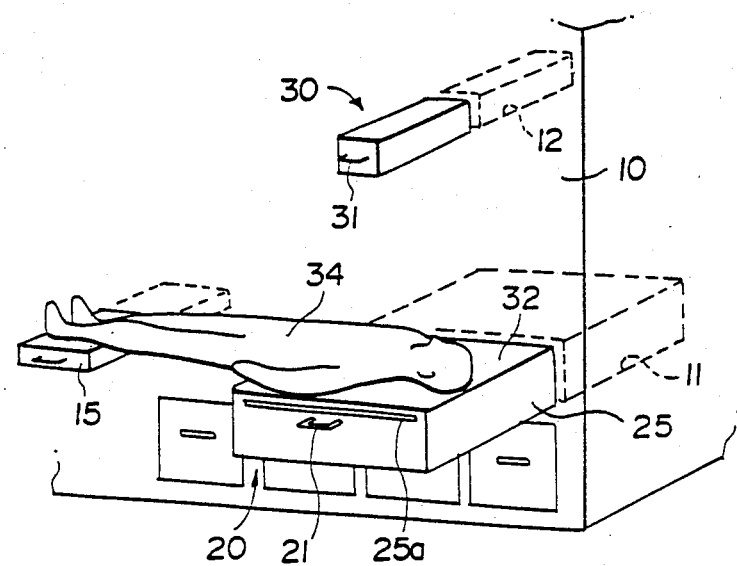
FIG. 7 is a general perspective view showing an embodiment of the second radiation image recording, read-out and reproducing apparatus in accordance with the present invention.

With reference to FIG. 7, an embodiment of the second radiation image recording, read-out and reproducing apparatus in accordance with the present invention comprises the main body 20 and a radiation source housing section 30 which are adapted to be housed in a wall surface 10 of a medical examination room or a hospital or the like. The main body 20 and the radiation source housing section 30 are housed in recesses 11 and 12 in the wall surface 10 when they are not to be used, and are pulled out of the wall surface 10, for example, by gripping at handles 21 and 31.

Figure 8:
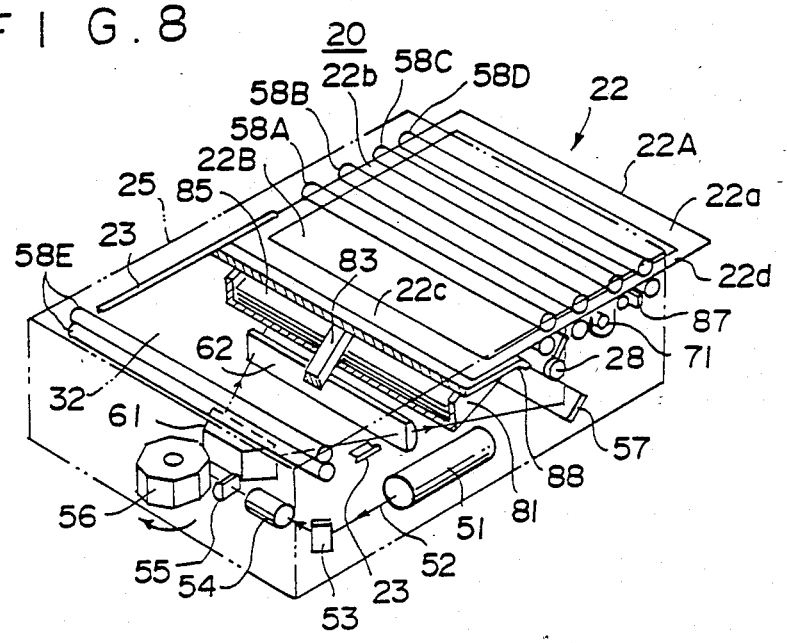
FIG. 8 is a partially cutaway perspective view showing the major part of the embodiment shown in FIG. 7, FIGS. 9 and 10 are schematic side views showing the conditions of the embodiment shown in FIG. 7 in the course of the image recording and in the course of the image read-out.
Figure 9:
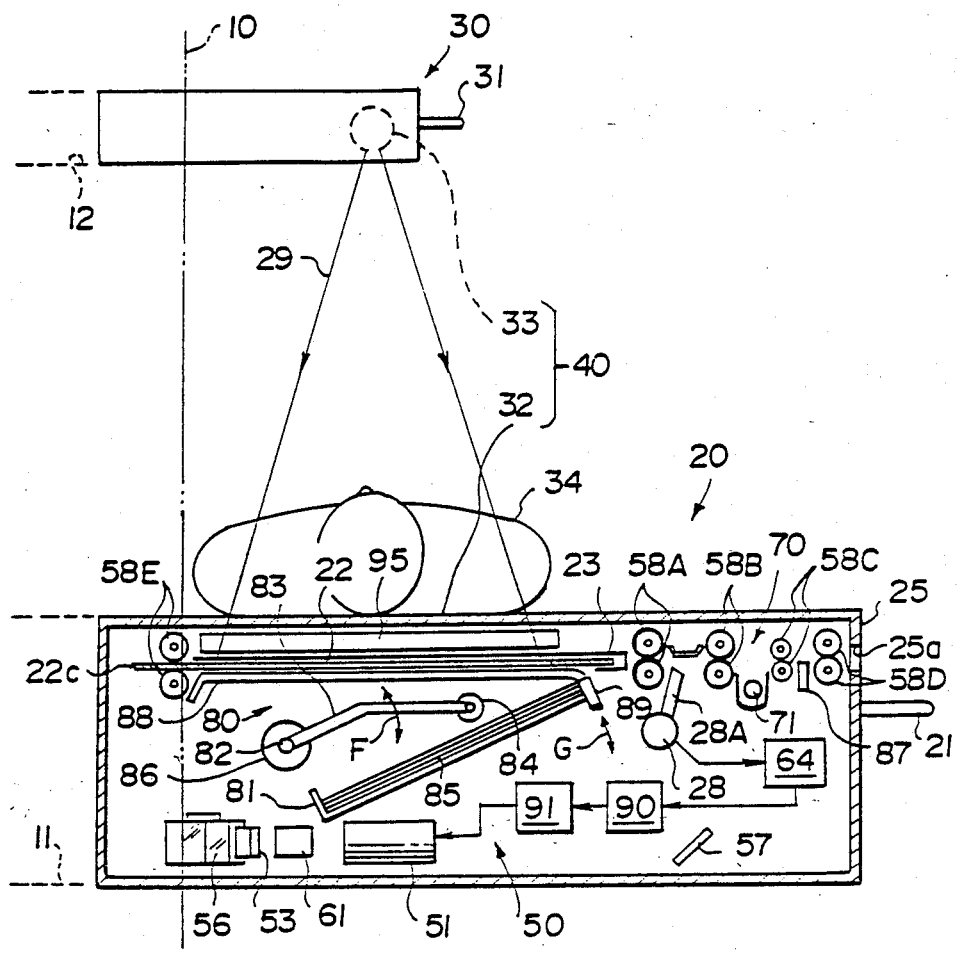

FIG. 8 shows the configuration of the main body 20 in detail, and FIG. 9 shows the side configurations of the main body 20 and the radiation source housing section 30. The stimulable phosphor sheet 22 constituted in the same manner as mentioned above is disposed in the case 25 of the main body 20. In this embodiment, the stimulable phosphor sheet 22 is disposed so that the stimulable phosphor layer 22B comes under the substrate 22A, and is supported in the case 25 with the holding portions 22b and 22d being slideably supported on rails 23, 23. The longitudinal and transverse dimensions of the case 25 are adjusted to be slightly larger than those of the stimulable phosphor sheet 22. The upper surface of the case 25, i.e. the surface thereof facing the stimulable phosphor sheet 22 from above when the stimulable phosphor sheet 22 is housed in the case 25, constitutes the image recording table 32. The radiation source housing section 30 houses therein the radiation source 33 constituted by an X-ray tube or the like. As shown in FIG. 9, in the use condition of the apparatus wherein the radiation source housing section 30 and the main body 20 have been pulled out of the wall surface 10, the radiation source 33 faces the image recording table 32. Also, as shown in FIGS. 7 and 9, an end of the case 25 (the end thereof on the side of the handle 21) is provided with the elongated opening 25a which faces the edge face of the stimulable phosphor sheet 22. The regions of the case 25 outside of the image recording table 32 are lined with a radiation absorbing material such as a lead plate so that no fog is caused to arise on the stimulable phosphor sheet 22 by environmental radiations or the like other than the radiation used for the image recording. Also, the opening 25a should preferably be provided with a raised material or the like for light shielding.

In the course of the recording of a radiation image of the object 34, the object 34 is made to lie, for example, on his back, on the image recording table 32, and the stimulable phosphor sheet 22 is positioned at the exposure position facing the image recording table 32 as shown in FIG. 9. The radiation source 33 is activated in this condition, and the stimulable phosphor sheet 22 is exposed to radiation 29 produced by the radiation source 33 and passing through the object 34 to have a radiation image of the object 34 stored thereon, specifically on the stimulable phosphor layer 22B formed on the lower surface side of the stimulable phosphor sheet 22. Thus, in this embodiment, the image recording section 40 is constituted by the image recording table 32 and the radiation source 33. In this embodiment, as shown in FIG. 7, the legs of the object 34 are supported by a supporting base 15 adapted to be housed in the wall surface 10. Also, as shown in FIG. 9, the grid 95 for absorbing radiation scattered by the object 34 is provided in the case 25 under the image recording table 32. The grid 95 may be constituted as a bucky device reciprocally moved in the horizontal direction.

The image read-out section 50 is provided below the stimulable phosphor sheet 22 in the case 25. The image read-out section 50 is provided with the laser beam source 51 constituted by, by way of example, a semiconductor laser, the mirror 53 for reflecting the laser beam 52 produced as stimulating rays by the laser beam source 51, the beam expander 54 for adjusting the beam diameter of the laser beam 52 to a predetermined value, the cylindrical lens 55 for making the laser beam 52 impinge upon the mirror surface of the light deflector 56 so as to form a linear image, and the light deflector 56 constituted by a rotating polygon mirror or the like for reflecting and deflecting the laser beam 52. The image read-out section 50 is also provided with the long mirror 57 for reflecting the deflected laser beam 52 so that the laser beam 52 scans the stimulable phosphor sheet 22, specifically the stimulable phosphor layer 22B thereof, in one direction, and the drive rollers 58A, 58B, 58C and 58D as the read-out sub-scanning means respectively composed of a pair of nip rollers for gripping the stimulable phosphor sheet 22 therebetween and rotated at a predetermined speed. The image read-out section 50 also comprises the long photomultiplier 28 as the photoelectric read-out means positioned so that the light receiving face thereof extends along the scanning line (main scanning line) of the laser beam 52 on the stimulable phosphor sheet 22, and the light guide member 28A optically coupled with the light receiving face of the long photomultiplier 28. Also, the $f\theta$ lens 61 and the cylindrical lens 62 are provided between the light deflector 56 and the mirror 57, and the laser beam 52 is thereby made to converge to a predetermined beam diameter at every position on the stimulable phosphor sheet 22.

Figure 10:
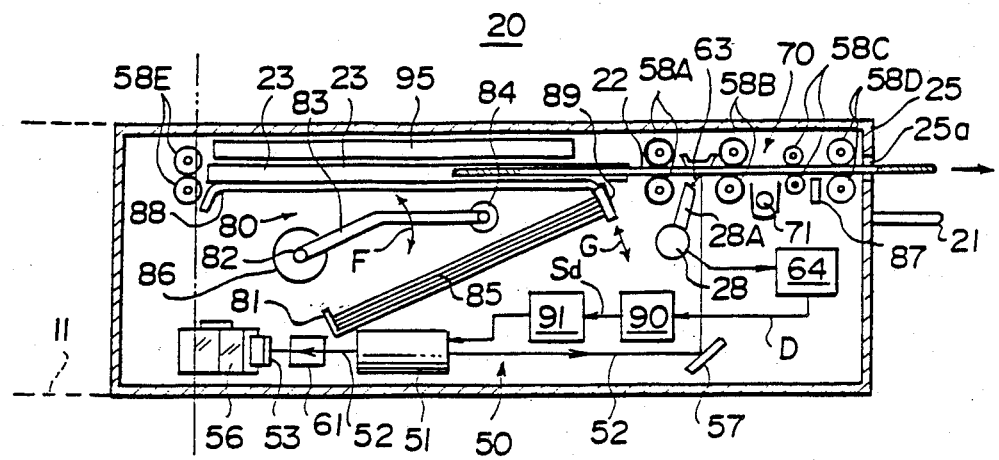

With reference to FIG. 10, after the radiation image of the object 34 has been stored on the stimulable phosphor sheet 22 in the manner as mentioned above, the drive rollers 58A, 58B, 58C and 58D are rotated, and the stimulable phosphor sheet 22 is moved at a predetermined speed toward the opening 25a. In the course of the radiation image recording, feed-out rollers 58E provided at the end of the case 25 opposite to the drive rollers 58A, 58B, 58C and 58D grasp the holding portion 22c formed at one end of the stimulable phosphor sheet 22. Therefore, when the feed-out rollers 58E are rotated together with the drive rollers 58A, 58B, 58C and 58D after the image recording has been carried out, the stimulable phosphor sheet 22 can be immediately conveyed as mentioned above. Simultaneously with the conveyance of the stimulable phosphor sheet 22, the laser beam source 51 and the light deflector 56 are activated, and the laser beam 52 scans on the stimulable phosphor sheet 22. As the stimulable phosphor sheet 22 is exposed to the laser beam 52, the exposed portion of the stimulable phosphor sheet 22 emits light 63 carrying the radiation image stored thereon. The emitted light 63 is efficiently detected by the long photomultiplier 28 via the light guide member 28A. The scanning of the laser beam 52 in the main scanning direction is carried out in the manner as mentioned above and, at the same time, the stimulable phosphor sheet 22 is moved in the sub-scanning direction in the manner as mentioned above. Accordingly, the emitted light 63, i.e. the radiation image, is two-dimensionally read out from the stimulable phosphor sheet 22. The read-out image signals generated by the long photomultiplier 28 are amplified, digitized and subjected to processing such as image processing in the read-out circuit 64, and are then sent to the image reproducing section 80.

As shown in FIG. 10, when the stimulable phosphor sheet 22 is moved by the drive rollers 58A, 58B, 58C and 58D for the purpose of the sub-scanning, the stimulable phosphor sheet 22 is projected out of the case 25 via the opening 25a. Also, the laser beam 52 scans the stimulable phosphor sheet 22 at the position near the opening 25a. Therefore, at the time the image read-out is finished, nearly the most part of the stimulable phosphor sheet 22 is projected out of the case 25. Accordingly, the case 25 need not be provided with a particular space for sub-scanning of the stimulable phosphor sheet 22, and may be formed in a size slightly larger than the size of the stimulable phosphor sheet 22 as mentioned above.

At the time the image read-out has been finished in the manner as mentioned above, the holding portion 22c of the stimulable phosphor sheet 22 is grasped between the drive rollers 58B. Then, the drive rollers 58A, 58B, 58C and 58D are rotated in the directions reverse to the directions of rotation at the time of the image read-out, and the stimulable phosphor sheet 22 is thereby returned to the exposure position inside of the case 25, i.e. to the position facing the image recording table 32. At this time, the stimulable phosphor sheet 22 passes over the erasing section 70 provided in the vicinity of the opening 25a in the case 25, and is subjected to the image (residual image) erasing. Buy way of example, the erasing section 70 is constituted by the erasing light source 71 provided below the stimulable phosphor sheet 22. The erasing light source 71 is constituted by a fluorescent lamp or the like, and mainly produces erasing light having a wavelength within the stimulation wavelength range for the stimulable phosphor of the stimulable phosphor sheet 22. The erasing light source 71 is turned on at the time the stimulable phosphor sheet 22 is returned to the exposure position. As the stimulable phosphor sheet 22 is exposed to the erasing light, the radiation energy remaining on the stimulable phosphor sheet 22 after the image read-out therefrom has been finished is released therefrom.

In this manner, the stimulable phosphor sheet 22 on which the image (residual image) has been erased to such an extent that the stimulable phosphor sheet 22 becomes reusable for the radiation image recording is housed in the case 25. Therefore, the image recording and the image read-out can be repeated by use of the stimulable phosphor sheet 22. In the case where the substrate 22A of the stimulable phosphor sheet 22 is formed of a light-permeable material, the erasing section 70 may be disposed to irradiate the erasing light from above the stimulable phosphor sheet 22.

Reproduction of the radiation image in the embodiment shown in FIG. 7 will be described hereinbelow. The image reproducing section 80 is provided with the recording sheet feed tray 81 disposed below the stimulable phosphor sheet 22 at the exposure position, the arm 83 supported swingably in the direction as indicated by the arrow F around the swing shaft 82, the recording sheet feed roller 84 supported at an extremity of the arm 83 for counter-clockwise rotation, the arm operation means 86 for swinging the arm 83 in the direction as indicated by the arrow F to push the recording sheet feed roller 84, which is being rotated, against heat development photosensitive material sheets 85, 85, ... as recording sheets stacked in the recording sheet feed tray 81, thereby to feed the recording sheets 85, 85, ... one by one out of the recording sheet feed tray 81, and the elongated heat source 87 for heat development extending over the overall width of the recording sheet 85 between the drive rollers 58C and 58D. Also, the stimulable phosphor sheet 22 returned to the exposure position is supported from below by the sheet support 88. The sheet support 88 is formed of a material such as lead having high radiation absorptivity, and prevents the radiation 29 and the laser beam 52 produced at the time of the image read-out from impinging upon the recording sheets 85, 85, ... in the recording sheet feed tray 81. Also, a light shielding member 89 moveable in the direction as indicated by the arrow G is provided at the upper end of the recording sheet feed tray 81. Normally, the light shielding member 89 closely contacts the right end of the sheet support 88. Only at the time the recording sheet 85 is to be fed out of the recording sheet feed tray 81, the light shielding member 89 is retracted down in synchronization with the arm 83. In this manner, the light shielding member 89 prevents the laser beam 52 from impinging upon the recording sheets 85, 85, ... in the recording sheet feed tray 81 at the time of the image read-out.

Digital image signals D generated by the read-out circuit 64 are fed to the reproduction control section 90. The reproduction control section 90 operate the light deflector 56, the drive rollers 58A, 58B, 58C and 58D in the same manner as in the course of the image read-out, and operates the arm operation means 86 and the recording sheet feed roller 84, thereby to feed the recording sheets 85, 85, ... one by one out of the recording sheet feed tray 81. The recording sheet 85 thus fed out is fed between the drive rollers 58A, and is conveyed toward the drive rollers 58D. Also, the reproduction control section 90 feeds operation control signals Sd based on the received digital image signals D to the driver 91 for the laser beam source 51. As the operation of the laser beam source 51 is controlled in this manner, the laser beam 52 modulated in accordance with the image signals D two-dimensionally scans the recording sheet 85. In this manner, a latent image of the image which the image signals D represent, i.e. a latent image of the radiation image which was stored on the stimulable phosphor sheet 22, is recorded on the heat development photosensitive material sheet 85. At the time of passage between the drive rollers 58C and 58D, the recording sheet 85 is heated by the heat source 87, so that the latent image is heat-developed and the radiation image is reproduced as a visible image on the recording sheet 85. The recording sheet 85 on which the radiation image has been recorded in this manner is fed out of the case 25 via the opening 25a. As mentioned above, instead of providing the heat source 87, the erasing light source 71 may be utilized as the heat source for the heat development.

Also, in the case where the instant photographic film is used as the recording sheet on which the radiation image is to be reproduced, the development processing solution may be spread by nipping the film between the drive rollers 58A, 58B, 58C and 58D.

In the aforesaid embodiment, the image read-out is carried out from the side opposite to the radiation irradiating side with respect to the stimulable phosphor sheet 22. However, it is also possible to carry out the image read-out from the same side as the radiation irradiating side by disposing the stimulable phosphor sheet 22 with the stimulable phosphor layer facing up in FIG. 9, and irradiating the laser beam 52 from above the stimulable phosphor sheet 22. However, in the case where the image read-out is carried out in the manner as in the aforesaid embodiment, the elements at the image read-out section can be disposed at the back of the exposure position, and the apparatus can be made smaller.

Figure 11:
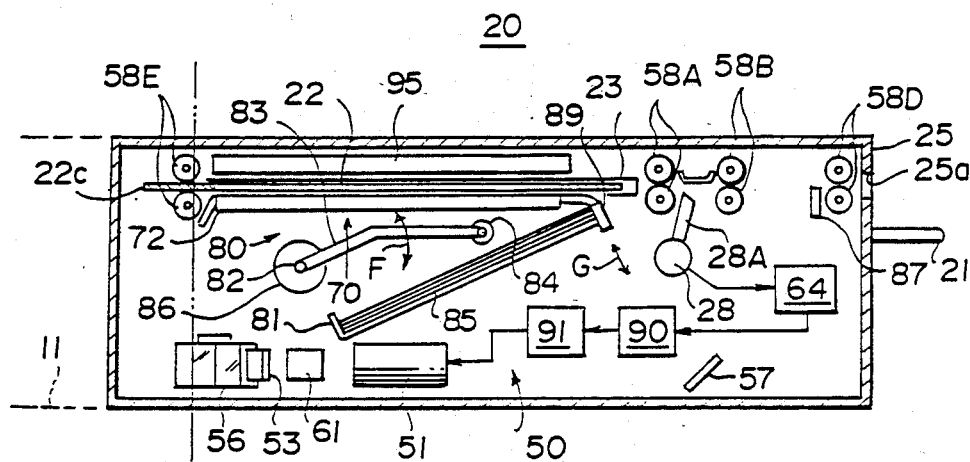
FIG. 11 is a schematic side view showing another embodiment of the second radiation image recording, read-out and reproducing apparatus in accordance with the present invention.

Also, as shown in FIG. 11, the erasing section 70 may be constituted by disposing a surface type erasing light source 72, which may be an EL (electroluminescence) plate, so that it faces the stimulable phosphor sheet 22 from below, i.e. from the side of the stimulable phosphor layer, at the exposure position. With the embodiment shown in FIG. 11, the aforesaid secondary erasing can be carried out easily by the utilization of the surface type erasing light source 72. Also, in the case where the erasing section 70 is constituted as shown in FIG. 11, instead of carrying out the image (residual image) erasing immediately after the stimulable phosphor sheet 22 on which the image read-out has been finished is returned into the case 25, the erasing may be carried out exactly prior to the next radiation image recording, thereby to perform the residual image erasing and the secondary erasing by a single erasing step. In this case, the radiation energy as the residual image component remaining on the stimulable phosphor sheet 22 is naturally released to some extent by its decay characteristics, and therefore the amount of the erasing light for the residual image erasing can be decreased.

We claim:

1. A radiation image recording, read-out and reproducing apparatus which comprises:
   i) a case for housing a stimulable phosphor sheet capable of storing a radiation image thereon, and provided at one case end with an opening though which a light shielding cover is to be passed,
   ii) the light shielding cover housed in said case for projection out of said case through said opening for passage of the light shielding cover, and provided with a sheet passage opening at an end on the side supported by said case at the time said light shielding cover is projected out of said case,
   iii) an image recording section for exposing said stimulable phosphor sheet, which is disposed at an exposure position inside of said light shielding cover projected out of said case, to radiation carrying image information, thereby to have the radiation image stored on said stimulable phosphor sheet,
   iv) an image read-out section provided with a read-out sub-scanning means for moving said stimulable phosphor sheet between said exposure position and a position in said case to which said stimulable phosphor sheet advances through said sheet passage opening, and a read-out main scanning means for scanning said stimulable phosphor sheet by a beam of stimulating rays in a main scanning direction at a position inside of said case in the vicinity of said opening for passage of the light shielding cover, wherein said stimulable phosphor sheet carrying said radiation image stored thereon is exposed to the beam of stimulating rays which cause said stimulable phosphor sheet to emit light in proportion to the stored radiation energy, and the emitted light is detected by a photoelectric read-out means to obtain image signals,
   v) an erasing section for releasing the radiation energy remaining on said stimulable phosphor sheet, for which the image read-out has been carried out at said image read-out section, before the image recording is carried out on said stimulable phosphor sheet, and
   vi) an image reproducing section for conveying a recording sheet housed in said case to feed said recording sheet out of said case through a recording sheet feed-out opening of said case and, at the same time, reproducing the image, which said image signals represent, on said recording sheet.

2. An apparatus as defined in claim 1 wherein said image reproducing section is provided with an image reproduction main scanning means for scanning a recording beam on said recording sheet in a main scanning direction, an image reproduction sub-scanning means for moving said recording sheet in a direction approximately normal to said main scanning direction, and a modulation means for modulating said recording beam in accordance with said image signals.

3. An apparatus as defined in claim 2 wherein said read-out main scanning means and said image reproduction main scanning means are constituted by the same elements.

4. An apparatus as defined in claim 2 wherein said read-out sub-scanning means and said image reproduction sub-scanning means are constituted by the same elements.

5. An apparatus as defined in claim 3 wherein said read-out sub-scanning means and said image reproduction sub-scanning means are constituted by the same elements.

6. An apparatus as defined in claim 2 wherein a beam source for producing said beam of stimulating rays and a beam source for producing said recording beam are constituted by the same elements.

7. An apparatus as defined in claim 3 wherein a beam source for producing said beam of stimulating rays and a beam source for producing said recording beam are constituted by the same elements.

8. An apparatus as defined in claim 4 wherein a beam source for producing said beam of stimulating rays and a beam source for producing said recording beam are constituted by the same elements.

9. An apparatus as defined in claim 5 wherein a beam source for producing said beam of stimulating rays and a beam source for producing said recording beam are constituted by the same elements.

10. An apparatus as defined in claim 1 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section.

11. An apparatus as defined in claim 2 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section.

12. An apparatus as defined in claim 3 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section.

13. An apparatus as defined in claim 4 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section.

14. An apparatus as defined in claim 5 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section.

15. An apparatus as defined in claim 6 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section.

16. An apparatus as defined in claim 7 wherein said stimulable phosphor sheet is composed of a substrate and a stimulable phosphor layer overlaid on said substrate, said stimulable phosphor sheet is disposed so that the radiation is irradiated from the substrate said in said light shielding cover, and stimulating rays are irradiated to said stimulable phosphor sheet from the stimulable phosphor layer side at said image read-out section.

17. An apparatus as defined in claim 8 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section.

18. An apparatus as defined in claim 9 wherein said stimulable phosphor sheet is composed of a substrate and a stimulable phosphor layer overlaid on said substrate, said stimulable phosphor sheet is disposed so that the radiation is irradiated from the substrate side in said light shielding cover, and stimulating rays are irradiated to said stimulable phosphor sheet from the stimulable phosphor layer side at said image read-out section 19. An apparatus as defined in claim 1 wherein said recording sheet is a heat development photosensitive material sheet, and said image reproducing section is provided with a development section having a heat source for development.

20. An apparatus as defined in claim 2 wherein said recording sheet is a heat development photosensitive material sheet, and said image reproducing section is provided with a development section having a heat source for development.

21. An apparatus as defined in claim 3 wherein said recording sheet is a heat development photosensitive material sheet, and said image reproducing section is provided with a development section having a heat source for development.

22. An apparatus as defined in claim 4 wherein said recording sheet is a heat development photosensitive material sheet, and said image reproducing section is provided with a development section having a heat source for development.

23. An apparatus as defined in claim 5 wherein said recording sheet is a heat development photosensitive material sheet, and said image reproducing section is provided with a development section having a heat source for development.

24. An apparatus as defined in claim 6 wherein said recording sheet is a heat development photosensitive material sheet, and said image reproducing section is provided with a development section having a heat source for development.

25. An apparatus as defined in claim 7 wherein said recording sheet is a heat development photosensitive material sheet, and said image reproducing section is provided with a development section having a heat source for development.

26. An apparatus as defined in claim 8 wherein said recording sheet is a heat development photosensitive material sheet, and said image reproducing section is provided with a development section having a heat source for development.

27. An apparatus as defined in claim 9 wherein said recording sheet is a heat development photosensitive material sheet, and said image reproducing section is provided with a development section having a heat source for development.

28. An apparatus as defined in claim 10 wherein said recording sheet is a heat development photosensitive material sheet, and said image reproducing section is provided with a development section having a heat source for development.

29. An apparatus as defined in claim 11 wherein said recording sheet is a heat development photosensitive material sheet, and said image reproducing section is provided with a development section having a heat source for development.

30. An apparatus as defined in claim 12 wherein said recording sheet is a heat development photosensitive material sheet, and said image reproducing section is provided with a development section having a heat source for development.

31. An apparatus as defined in claim 13 wherein said recording sheet is a heat development photosensitive material sheet, and said image reproducing section is provided with a development section having a heat source for development.

32. An apparatus as defined in claim 14 wherein said recording sheet is a heat development photosensitive material sheet, and said image reproducing section is provided with a development section having a heat source for development.

33. An apparatus as defined in claim 15 wherein said recording sheet is a heat development photosensitive material sheet, and said image reproducing section is provided with a development section having a heat source for development.

34. An apparatus as defined in claim 16 wherein said recording sheet is a heat development photosensitive material sheet, and said image reproducing section is provided with a development section having a hear source for development.

35. An apparatus as defined in claim 17 wherein said recording sheet is a heat development photosensitive material sheet, and said image reproducing section is provided with a development section having a heat source for development.

36. An apparatus as defined in claim 18 wherein said recording sheet is a heat development photosensitive material sheet, and said image reproducing section is provided with a development section having a heat source for development.

37. An apparatus as defined in any of claims 19 to 36 wherein said erasing section is utilized in common with said development section.

38. A radiation image recording, read-out and reproducing apparatus which comprises:
   i) a case for housing a stimulable phosphor sheet capable of storing a radiation image thereon, and provided at one case end with a stimulable phosphor sheet passage opening though which the stimulable phosphor sheet is to be passed,
   ii) an image recording section for exposing said stimulable phosphor sheet disposed at an exposure position inside of said case to radiation carrying image information, thereby to have the radiation image stored on said stimulable phosphor sheet,
   iii) an image read-out section provided with a read-out sub-scanning means for moving said stimulable phosphor sheet between said exposure position and a position to which said stimulable phosphor sheet is projected out of said case through said opening, and a read-out main scanning means for scanning said stimulable phosphor sheet by a beam of stimulating rays in a main scanning direction at a position inside of said case in the vicinity of said opening, wherein said stimulable phosphor sheet carrying said radiation image stored thereon is exposed to the beam of stimulating rays which cause said stimulable phosphor sheet to emit light in proportion to the stored radiation energy, and the emitted light is detected by a photoelectric read-out means to obtain image signals,
   iv) an erasing section for releasing the radiation energy remaining on said stimulable phosphor sheet, for which the image read-out has been carried out at said image read-out section, before the image recording is carried out on said stimulable phosphor sheet, and
   v) an image reproducing section for convey a recording sheet housed in said case to feed said recording sheet out of said case through a recording sheet feed-out opening of said case and, at the same time, reproducing the image, which said image signals represent, on said recording sheet.

39. An apparatus as defined in claim 38 wherein said image reproducing section is provided with an image reproduction main scanning means for scanning a recording beam on said recording sheet in a main scanning direction, an image reproduction sub scanning means for moving said recording sheet in a direction approximately normal to said main scanning direction, and a modulation means for modulating said recording beam in accordance with said image signals.

40. An apparatus as defined in claim 39 wherein said read-out main scanning means and said image reproduction main scanning means are constituted by the same elements.

41. An apparatus as defined in claim 39 wherein said read-out sub-scanning means and said image reproduction sub-scanning means are constituted by the same elements, and said stimulable phosphor sheet passage opening and said recording sheet feed-out opening are constituted by the same elements.

42. An apparatus as defined in claim 40 wherein said read-out sub-scanning means and said image reproduction sub-scanning means are constituted buy the same element, and said stimulable phosphor sheet passage opening and said recording sheet feed-out opening are constituted by the same element.

43. An apparatus as defined in claim 39 wherein a beam source for producing said beam of stimulating rays and a beam source for producing said recording beam are constituted by the same element.

44. An apparatus as defined in claim 40 wherein a beam source for producing said beam of stimulating rays and a beam source for producing said recording beam are constituted by the same element.

45. An apparatus as defined in claim 41 wherein a beam source for producing said beam of stimulating rays and a beam source for producing said recording beam are constituted by the same element.

46. An apparatus as defined in claim 42 wherein a beam source for producing said beam of stimulating rays and a beam source for producing said recording beam are constituted by the same element.

47. An apparatus as defined in claim 38 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

48. An apparatus as defined in claim 39 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

49. An apparatus as defined in claim 40 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

50. An apparatus a defined in claim 41 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

51. An apparatus as defined in claim 42 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

52. An apparatus as defined in claim 43 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

53. An apparatus as defined in claim 44 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

54. An apparatus as defined in claim 45 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

55. An apparatus as defined in claim 46 wherein said stimulable phosphor sheet is composed of a substrate and a stimulable phosphor layer overlaid on said substrate, said stimulable phosphor sheet is disposed so that the radiation is irradiated from the substrate side in said case, and stimulating rays are irradiated to said stimulable phosphor sheet from the stimulable phosphor layer side at said image read-out section.

56. An apparatus as defined in claim 38 wherein said recording sheet is a heat development photosensitive material sheet, and said image reproducing section is provided with a development section having a heat source for development.

57. An apparatus as defined in claim 39 wherein said recording sheet is a heat development photosensitive material sheet, and said image reproducing section is provided with a development section having a heat source for development.

58. An apparatus as defined in claim 40 wherein said recording sheet is a heat development photosensitive material sheet, and said image reproducing section is provided with a development section having a heat source for development.

59. An apparatus as defined in claim 41 wherein said recording sheet is a heat development photosensitive material sheet, and said image reproducing section is provided with a development section having a heat source for development.

60. An apparatus as defined in claim 42 wherein said recording sheet is a heat development photosensitive material sheet, and said image reproducing section is provided with a development section having a heat source for development.

61. An apparatus as defined in claim 43 wherein said recording sheet is a heat development photosensitive material sheet, and said image reproducing section is provided with a development section having a heat source for development.

62. An apparatus as defined in claim 44 wherein said recording sheet is a heat development photosensitive material sheet, and said image reproducing section is provided with a development section having a heat source for development.

63. An apparatus as defined in claim 45 wherein said recording sheet is a heat development photosensitive material sheet, and said image reproducing section is provided with a development section having a heat source for development.

64. An apparatus as defined in claim 46 wherein said recording sheet is a heat development photosensitive material sheet, and said image reproducing section is provided with a development section having a heat source for development.

65. An apparatus as defined in claim 47 wherein said recording sheet is a heat development photosensitive material sheet, and said image reproducing section is provided with a development section having a heat source for development.

66. An apparatus as defined in claim 48 wherein said recording sheet is a heat development photosensitive material sheet, and said image reproducing section is provided with a development section having a heat source for development.

67. An apparatus as defined in claim 49 wherein said recording sheet is a heat development photosensitive material sheet, and said image reproducing section is provided with a development section having a heat source for development.

68. An apparatus as defined in claim 50 wherein said recording sheet is a heat development photosensitive material sheet, and said image reproducing section is provided with a development section having a heat source for development.

69. An apparatus as defined in claim 51 wherein said recording sheet is a heat development photosensitive material sheet, and said image reproducing section is provided with a development section having a heat source for development.

70. An apparatus as defined in claim 52 wherein said recording sheet is a heat development photosensitive material sheet, and said image reproducing section is provided with a development section having a heat source for development.

71. An apparatus as defined in claim 53 wherein said recording sheet is a heat development photosensitive material sheet, and said image reproducing section is provided with a development section having a heat source for development.

72. An apparatus as defined in claim 54 wherein said recording sheet is a heat development photosensitive material sheet, and said image reproducing section is provided with a development section having a heat source for development.

73. An apparatus as defined in claim 55 wherein said recording sheet is a heat development photosensitive material sheet, and said image reproducing section is provided with a development section having a heat source for development.

74. An apparatus as defined in any of claims 56 to 73 wherein said erasing section is utilized in common with said development section.

* * * * *